(12) United States Patent
Worley, III et al.

(10) Patent No.: US 9,111,326 B1
(45) Date of Patent: Aug. 18, 2015

(54) DESIGNATION OF ZONES OF INTEREST WITHIN AN AUGMENTED REALITY ENVIRONMENT

(75) Inventors: William Spencer Worley, III, Half Moon Bay, CA (US); William Thomas Weatherford, San Mateo, CA (US); Christopher Coley, Morgan Hill, CA (US); Edward Dietz Crump, Santa Cruz, CA (US); Jonathan Betts-LaCroix, Belmont, CA (US)

(73) Assignee: Rawles LLC, Wilmington, DE (US)

( * ) Notice: Subject to any disclaimer, the term of this patent is extended or adjusted under 35 U.S.C. 154(b) by 1099 days.

(21) Appl. No.: 12/975,175

(22) Filed: Dec. 21, 2010

(51) Int. Cl.
| | | |
|---|---|---|
| G06T 7/00 | (2006.01) | |
| G06T 19/00 | (2011.01) | |
| G06K 9/00 | (2006.01) | |
| H04N 7/18 | (2006.01) | |

(52) U.S. Cl.
CPC .............. *G06T 7/00* (2013.01); *G06T 19/006* (2013.01); *G06K 9/00771* (2013.01); *H04N 7/188* (2013.01)

(58) Field of Classification Search
CPC ...... H04N 7/18; G08B 13/196; G08B 15/008; G08B 13/19602; G08B 13/00; G06K 9/00771; G06T 7/00
USPC ............ 348/153–155, 159; 340/541; 715/863
See application file for complete search history.

(56) References Cited

U.S. PATENT DOCUMENTS

| | | | |
|---|---|---|---|
| 3,835,245 A | 9/1974 | Pieters | |
| 3,840,699 A | 10/1974 | Bowerman | |
| 4,112,463 A | 9/1978 | Kamin | |
| 5,704,836 A * | 1/1998 | Norton et al. | 463/36 |
| 5,946,209 A * | 8/1999 | Eckel et al. | 700/14 |
| 6,059,576 A * | 5/2000 | Brann | 434/247 |
| 6,098,091 A | 8/2000 | Kisor | |
| 6,503,195 B1 | 1/2003 | Keller et al. | |
| 6,618,076 B1 | 9/2003 | Sukthankar et al. | |
| 6,690,618 B2 * | 2/2004 | Tomasi et al. | 367/127 |
| 6,760,045 B1 | 7/2004 | Quinn et al. | |
| 6,789,903 B2 | 9/2004 | Parker et al. | |
| 6,803,928 B2 | 10/2004 | Bimber et al. | |
| 6,811,267 B1 | 11/2004 | Allen et al. | |
| 7,046,214 B2 | 5/2006 | Ebersole, Jr. et al. | |
| 7,315,241 B1 | 1/2008 | Daily et al. | |
| 7,418,392 B1 | 8/2008 | Mozer et al. | |
| 7,538,764 B2 | 5/2009 | Salomie | |
| 7,720,683 B1 | 5/2010 | Vermeulen et al. | |
| 7,743,348 B2 | 6/2010 | Robbins et al. | |
| 7,774,204 B2 | 8/2010 | Mozer et al. | |

(Continued)

FOREIGN PATENT DOCUMENTS

| | | |
|---|---|---|
| WO | WO2009112585 | 9/2009 |
| WO | WO2011088053 A2 | 7/2011 |

OTHER PUBLICATIONS

FOSCAM, "User Manual, Model:FI9821W", http://foscam.us/downloads/FI9821W%20user%20manual.pdf, May 2010, pp. 45-46.*

(Continued)

*Primary Examiner* — Michelle L Sams
(74) *Attorney, Agent, or Firm* — Lee & Hayes, PLLC

(57) ABSTRACT

An augmented reality system is configured to identify and track user gestures, sounds, and interaction with physical objects to designate active zones. These active zones may be allocated additional processing and functional resources. Gestures may include particular hand or body motions, orientation of a user's head, and so forth. Sounds may include clapping, clicks, whistles, taps, footfalls, humming, singing, speech, and so forth. Active areas as well as inactive areas of lesser or no interest may be designated as well.

29 Claims, 16 Drawing Sheets

(56) References Cited

U.S. PATENT DOCUMENTS

| | | | |
|---|---|---|---|
| 7,911,444 B2 | 3/2011 | Yee | |
| 7,925,996 B2 | 4/2011 | Hofmeister et al. | |
| 7,949,148 B2 | 5/2011 | Rhoads et al. | |
| 8,107,736 B2 | 1/2012 | Brown et al. | |
| 8,159,739 B2 | 4/2012 | Woodgate et al. | |
| 8,199,966 B2 | 6/2012 | Guven et al. | |
| 8,253,746 B2 | 8/2012 | Geisner et al. | |
| 8,264,536 B2 | 9/2012 | McEldowney | |
| 8,284,205 B2 | 10/2012 | Miller et al. | |
| 8,285,256 B2 | 10/2012 | Gupta et al. | |
| 8,307,388 B2 | 11/2012 | Igoe et al. | |
| 8,308,304 B2 | 11/2012 | Jung et al. | |
| 8,382,295 B1 | 2/2013 | Kim et al. | |
| 8,408,720 B2 | 4/2013 | Nishigaki et al. | |
| 8,591,039 B2 | 11/2013 | Morrison et al. | |
| 2001/0049713 A1 | 12/2001 | Arnold et al. | |
| 2002/0001044 A1 | 1/2002 | Villamide | |
| 2002/0070278 A1 | 6/2002 | Hung et al. | |
| 2004/0046736 A1* | 3/2004 | Pryor et al. | 345/156 |
| 2004/0190716 A1 | 9/2004 | Nelson | |
| 2004/0201823 A1 | 10/2004 | Raskar et al. | |
| 2005/0081164 A1 | 4/2005 | Hama et al. | |
| 2005/0110964 A1 | 5/2005 | Bell et al. | |
| 2005/0128196 A1 | 6/2005 | Popescu et al. | |
| 2005/0254683 A1 | 11/2005 | Schumann et al. | |
| 2005/0264555 A1 | 12/2005 | Zhou et al. | |
| 2005/0276444 A1 | 12/2005 | Zhou et al. | |
| 2005/0288078 A1 | 12/2005 | Cheok et al. | |
| 2005/0289590 A1 | 12/2005 | Cheok et al. | |
| 2006/0028400 A1 | 2/2006 | Lapstun et al. | |
| 2006/0041926 A1* | 2/2006 | Istvan et al. | 725/133 |
| 2006/0080408 A1 | 4/2006 | Istvan et al. | |
| 2006/0152803 A1 | 7/2006 | Provitola | |
| 2006/0170880 A1 | 8/2006 | Dambach et al. | |
| 2006/0262140 A1 | 11/2006 | Kujawa et al. | |
| 2007/0005747 A1 | 1/2007 | Batni et al. | |
| 2007/0024644 A1 | 2/2007 | Bailey | |
| 2007/0239211 A1 | 10/2007 | Lorincz et al. | |
| 2007/0260669 A1 | 11/2007 | Neiman et al. | |
| 2008/0094588 A1 | 4/2008 | Cole et al. | |
| 2008/0151195 A1 | 6/2008 | Pacheco et al. | |
| 2008/0174735 A1 | 7/2008 | Quach et al. | |
| 2008/0180640 A1 | 7/2008 | Ito | |
| 2008/0186255 A1 | 8/2008 | Cohen et al. | |
| 2008/0229318 A1 | 9/2008 | Franke | |
| 2008/0273754 A1* | 11/2008 | Hick et al. | 382/103 |
| 2009/0066805 A1 | 3/2009 | Fujiwara et al. | |
| 2009/0073034 A1 | 3/2009 | Lin | |
| 2010/0011637 A1 | 1/2010 | Zhang | |
| 2010/0026479 A1* | 2/2010 | Tran | 340/501 |
| 2010/0060723 A1 | 3/2010 | Kimura et al. | |
| 2010/0066676 A1* | 3/2010 | Kramer et al. | 345/158 |
| 2010/0164990 A1 | 7/2010 | Van Doorn | |
| 2010/0199232 A1 | 8/2010 | Mistry et al. | |
| 2010/0207872 A1 | 8/2010 | Chen et al. | |
| 2010/0240455 A1 | 9/2010 | Gagner et al. | |
| 2010/0257252 A1 | 10/2010 | Dougherty et al. | |
| 2010/0284055 A1 | 11/2010 | Kothari et al. | |
| 2011/0012925 A1 | 1/2011 | Luo | |
| 2011/0050885 A1 | 3/2011 | McEldowney | |
| 2011/0061100 A1 | 3/2011 | Mattila et al. | |
| 2011/0072047 A1 | 3/2011 | Wang et al. | |
| 2011/0087731 A1 | 4/2011 | Wong et al. | |
| 2011/0093094 A1* | 4/2011 | Goyal et al. | 700/12 |
| 2011/0096844 A1 | 4/2011 | Poupel et al. | |
| 2011/0134204 A1* | 6/2011 | Rodriguez et al. | 348/14.03 |
| 2011/0154350 A1 | 6/2011 | Doyle et al. | |
| 2011/0161912 A1 | 6/2011 | Eteminan et al. | |
| 2011/0164163 A1 | 7/2011 | Bilbrey et al. | |
| 2011/0197147 A1 | 8/2011 | Fai | |
| 2011/0216090 A1 | 9/2011 | Woo et al. | |
| 2011/0238751 A1 | 9/2011 | Belimpasakis et al. | |
| 2011/0249197 A1 | 10/2011 | Sprowl et al. | |
| 2012/0009874 A1 | 1/2012 | Kiukkonen et al. | |
| 2012/0120296 A1 | 5/2012 | Roberts et al. | |
| 2012/0127320 A1 | 5/2012 | Balogh | |
| 2012/0130513 A1 | 5/2012 | Hao et al. | |
| 2012/0223885 A1 | 9/2012 | Perez | |
| 2012/0306878 A1 | 12/2012 | Wang et al. | |
| 2013/0235354 A1 | 9/2013 | Kilcher et al. | |
| 2013/0300637 A1 | 11/2013 | Smits et al. | |

OTHER PUBLICATIONS

Office Action for U.S. Appl. No. 12/977,949, mailed on Jan. 22, 2014, William Spencer Worley III, "Powered Augmented Reality Projection Accessory Display Device", 11 pages.

Office action for U.S. Appl. No. 12/977,924, mailed on Nov. 15, 2013, Coley, et al., "Characterization of a Scene With Structured Light", 9 pages.

Office Action for U.S. Appl. No. 13/236,294, mailed on Nov. 7, 2013, Christopher Coley, "Optical Interference Mitigation", 12 pages.

Office Action for U.S. Appl. No. 12/982,457, mailed on Dec. 3, 2013, William Spencer Worley III, "Utilizing Content Output Devices in an Augmented Reality Environment", 56 pages.

Office action for U.S. Appl. No. 12/982,519, mailed on Feb. 7, 2013, Worley III, "Complementing Operation of Display Devices in an Augmented Reality Environment", 13 pages.

Pinhanez, "The Everywhere Displays Projector: A Device to Create Ubiquitous Graphical Interfaces", IBM Thomas Watson Research Center, Ubicomp 2001, 18 pages.

Office Action for U.S. Appl. No. 12/978,800, mailed on Oct. 25, 2013, William Spencer Worley III, "Integrated Augmented Reality Environment", 36 pages.

Office action for U.S. Appl. No. 12/977,760, mailed on Jun. 4, 2013, Worley III et al., "Generation and Modulation of Non-Visible Structured Light", 12 pages.

Office action for U.S. Appl. No. 12/982,519, mailed on Aug. 29, 2013, Worley III, "Complementing Operation of Display Devices in an Augmented Reality Environment", 12 pages.

Sneath, "The Bumper List of Windows 7 Secrets", retrieved on Aug. 21, 2013, at http://blogs.msdn.com/b/tims/archive/2009/01/12/the-bumper-list-of-windows-7-secrets.aspx., 2009, 13 pages.

Office action for U.S. Appl. No. 12/977,760, mailed on Oct. 15, 2012, Worley III et al., "Generation and Modulation of Non-Visible Structured Light", 13 pages.

Office Action for U.S. Appl. No. 12/982,519, mailed on Feb. 12, 2014, William Spencer Worley III, "Complementing Operation of Display Devices in an Augmented Reality Environment", 12 pages.

Final Office Action for U.S. Appl. No. 13/236,294, mailed on Mar. 13, 2014, Christopher Coley, "Optical Interference Mitigation", 14 pages.

Office Action for U.S. Appl. No. 12/977,992, mailed on Apr. 4, 2014, William Spencer Worley III, "Unpowered Augmented Reality Projection Accessory Display Device", 6 pages.

Final Office Action for U.S. Appl. No. 12/982,457, mailed on May 8, 2014, William Spencer Worley III, "Utilizing Content Output Devices in an Augmented Reality Environment", 58 pages.

Office action for U.S. Appl. No. 12/978,800, mailed on Jun. 17, 2014, Worley III, "Integrated Augmented Reality Environment", 40 pages.

Office Action for U.S. Appl. No. 12/977,760, mailed on Oct. 16, 2014, William Spencer Worley III, "Generation and Modulation of Non-Visible Structured Light", 11 pages.

Office Action for U.S. Appl. No. 13/236,294, mailed on Oct. 22, 2014, Christopher Coley, "Optical Interference Mitigation", 20 pages.

Office action for U.S. Appl. No. 12/982,457, mailed on Oct. 8, 2014, Worley III et al., "Utilizing Content Output Devices in an Augmented Reality Environment", 62 pages.

Office Action for U.S. Appl. No. 12/978,800, mailed on Dec. 2, 2014, William Spencer Worley III, "Integrated Augmented Reality Environment", 46 pages.

Office Action for U.S. Appl. No. 12/982,519, mailed on Aug. 14, 2014, Worley III, "Complementing Operation of Display Devices in an Augmented Reality Environment", 12 pages.

Office Action for U.S. Appl. No. 12/982,519, mailed on Mar. 5, 2015, William Spencer Worley III, "Complementing Operation of Display Devices in an Augmented Reality Environment", 13 pages.

* cited by examiner

DESIGNATION OF ZONES OF INTEREST WITHIN AN AUGMENTED REALITY ENVIRONMENT

BACKGROUND

Augmented reality allows interaction between users and real-world objects and virtual or computer-generated objects and information. These interactions may include verbal, physical, or other input signals made within a scene such as a room. However, in some scenes, monitoring and processing the data from the entire volume of the scene may be impractical where scan resolution is high, the physical environment is large, limited resources are available, and so forth. What is desired is a way to focus scanning and processing resources on particular regions of interest within the scene to reduce resource requirements.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
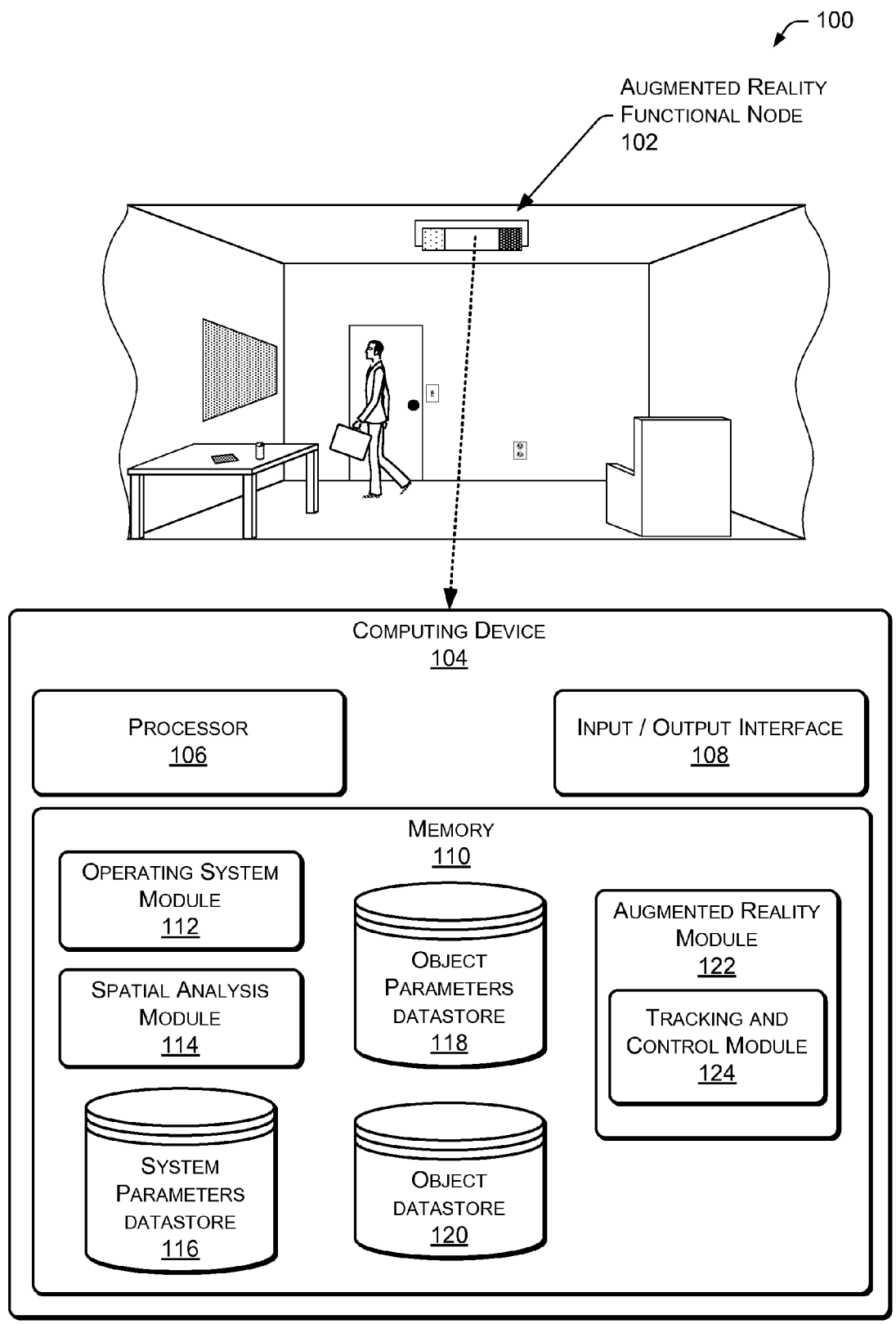
FIG. 1 shows an illustrative scene with an augmented reality environment set in an exemplary room. The augmented reality environment is provided, in part, by an augmented reality functional node located in the scene. Within or coupled to the node is a computing device that executes a tracking and control module to generate zones within the scene.

Augmented reality environments may incorporate scenes or volumes large and small. Maintaining an augmented reality environment within scenes that are volumetrically larger, include many users, have many objects, and so forth may be challenging due to scarcity of resources. These resources may include computational resources, projection resources, scanning resources, and so on. Resources may be allocated to specific volumes or zones of interest which allows for better utilization of those resources, improved accuracy, additional scan detail, and so forth. For example, a particular zone near the user may be scanned at a high resolution to discern finger movements rather than an entire room.

Disclosed herein are devices and techniques for determination and designation of volumes or zones within the augmented reality environment. Some zones may be designated regions of particular interest, or active zones. Within these active zones, the user may issue input commands such as speaking, gesturing, manipulating a physical object, and so forth. These input commands are then acted upon by the augmented reality system. Within these active zones scanning and processing of those gestures may be allocated additional resources necessary to discern input commands. These resources may reside locally or in a cloud of computing resources.

Similarly, some volumes may be designated regions of non-interest, or inactive zones. Within these inactive zones, the augmented reality system does not scan for input commands, but may monitor on a limited basis to ascertain an attention command input. This minimizes the utilization of resources for volumes which are considered unlikely for user input. For example, within a room with cathedral ceilings, the volume starting three meters above the floor may be designated as an inactive zone.

The attention command input may be a sound, gesture, or other signal which triggers the formation of an active zone. The active zone may be proximate to or encompass the source of the attention command input, or appear at a pre-determined location. For example, the attention command input may comprise a user snapping his fingers. Within an otherwise inactive zone, the snapping may be detected, its location determined, and an active zone formed which encompasses the volume in which the snap sound occurred.

Active and inactive zones may be associated with particular locations or objects. The zones may be dynamic in that they track and follow a particular object, or static in that they exist in a particular location or volume within the augmented reality environment. For example, a dynamic active zone may track the upper torso of a user to scan for input such as speech, hand gestures, and so forth. Likewise, a dynamic inactive zone may be designated to surround an object that the user may interact with, such as a beverage can. While in this inactive zone, the augmented reality system would not expend system resources trying to determine whether the placement of fingers or movement of the hand next to the beverage can is intended as an input rather than simply trying to pick up the can.

As described herein for illustration and not by way of limitation, the augmented reality input and output may be provided at least in part by a combination of an image projector configured to generate structured light patterns and a camera to image those patterns incorporated into a single unit and designated an augmented reality functional node (ARFN). In other implementations, other configurations of one or more projectors and one or more cameras may be used, and other sensors such as microphones, ultrasound transducers, and so forth may be also be present within or coupled to the ARFN.

Illustrative Environment

FIG. 1 shows an illustrative augmented reality environment 100 which includes an augmented reality functional node (ARFN) 102 with associated computing device 104. In this illustration, the ARFN 102 is positioned in mid-ceiling of the scene, in this case a room. In other implementations, the ARFN 102 may be positioned in other locations within the scene. The ARFN 102 may access additional resources, such as those on the local area network, or cloud resources accessible via a wide area network.

The ARFN 102 is coupled to the computing device 104. This computing device may be within the ARFN 102, or disposed at another location and coupled to the ARFN 102 via a wired or wireless network. The computing device 104 comprises a processor 106, an input/output interface 108, and a memory 110. The processor 106 may comprise one or more processors configured to execute instructions. The instructions may be stored in memory 110, or in other memory accessible to the processor 106, such as storage in the cloud.

The input/output interface 108 may be configured to couple the computing device 104 to other components, such as projector, cameras, microphones, other ARFNs 102, other computing devices, and so forth. The coupling between the computing device 104 and the components may be via wire, fiber optic cable, wireless, or other connections.

The memory 110 may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device.

Several modules such as instruction, datastores, and so forth may be stored within the memory 110 and configured to execute on a processor, such as the processor 106. An operating system module 112 is configured to manage hardware and services within and coupled to the computing device 104 for the benefit of other modules.

A spatial analysis module 114 is configured to perform several functions which may include analyzing a scene to generate a topology, recognizing objects in the scene, dimensioning the objects, and modeling the scene. Characterization may be facilitated using several technologies including structured light, light detection and ranging (LIDAR), optical time-of-flight, ultrasonic ranging, stereoscopic imaging, radar, and so forth either alone or in combination with one another. For convenience, and not by way of limitation, the examples in this disclosure refer to structured light. The spatial analysis module 114 provides the information used within the augmented reality environment to provide an interface between the physicality of the scene and virtual objects and information.

A system parameters datastore 116 is configured to maintain information about the state of the computing device 104, the input/output devices of the ARFN 102, and so forth. For example, system parameters may include current pan and tilt settings of the cameras and projectors. As used in this disclosure, datastore includes lists, arrays, databases, and other data structures used to provide storage and retrieval of data.

An object parameters datastore 118 in the memory 110 is configured to maintain information about the state of objects within the scene. The object parameters may include the surface contour of the object, overall reflectivity, color, and so forth. This information may be acquired from the ARFN 102, other input devices, or via manual input and stored within the object parameters datastore 118.

An object datastore 120 is configured to maintain a library of pre-loaded reference objects. This information may include assumptions about the object, dimensions, and so forth. For example, the object datastore 120 may include a reference object of a beverage can and include the assumptions that beverage cans are either held by a user or sit on a surface, and are not present on walls or ceilings. The spatial analysis module 114 may use this data maintained in the datastore 120 to test dimensional assumptions when determining the dimensions of objects within the scene. In some implementations the object parameters in the object parameters datastore 118 may be incorporated into the object datastore 120. For example, objects in the scene which are temporally persistent, such as walls, a particular table, particular users, and so forth may be stored within the object datastore 120. The object datastore 120 may be stored on one or more of the memory of the ARFN 102, storage devices accessible on the local network, or cloud storage accessible via a wide area network.

An augmented reality module 122 is configured to generate augmented reality output in concert with the physical environment. The augmented reality module 122 includes a tracking and control module 124 configured to maintain active and inactive zones within the environment. For example, the augmented reality module 122 may be configured to project an image onto a wall. The image may be associated with an active zone maintained by the tracking and control module 124. This active zone may encompass a user's torso. As the user (and corresponding active zone) moves, the virtual image on the wall shifts to maintain a position relative to the active zone, and thus the user. The augmented reality module 122 may access input/output devices within one or more ARFNs 102 to generate output and receive input.

Figure 2:
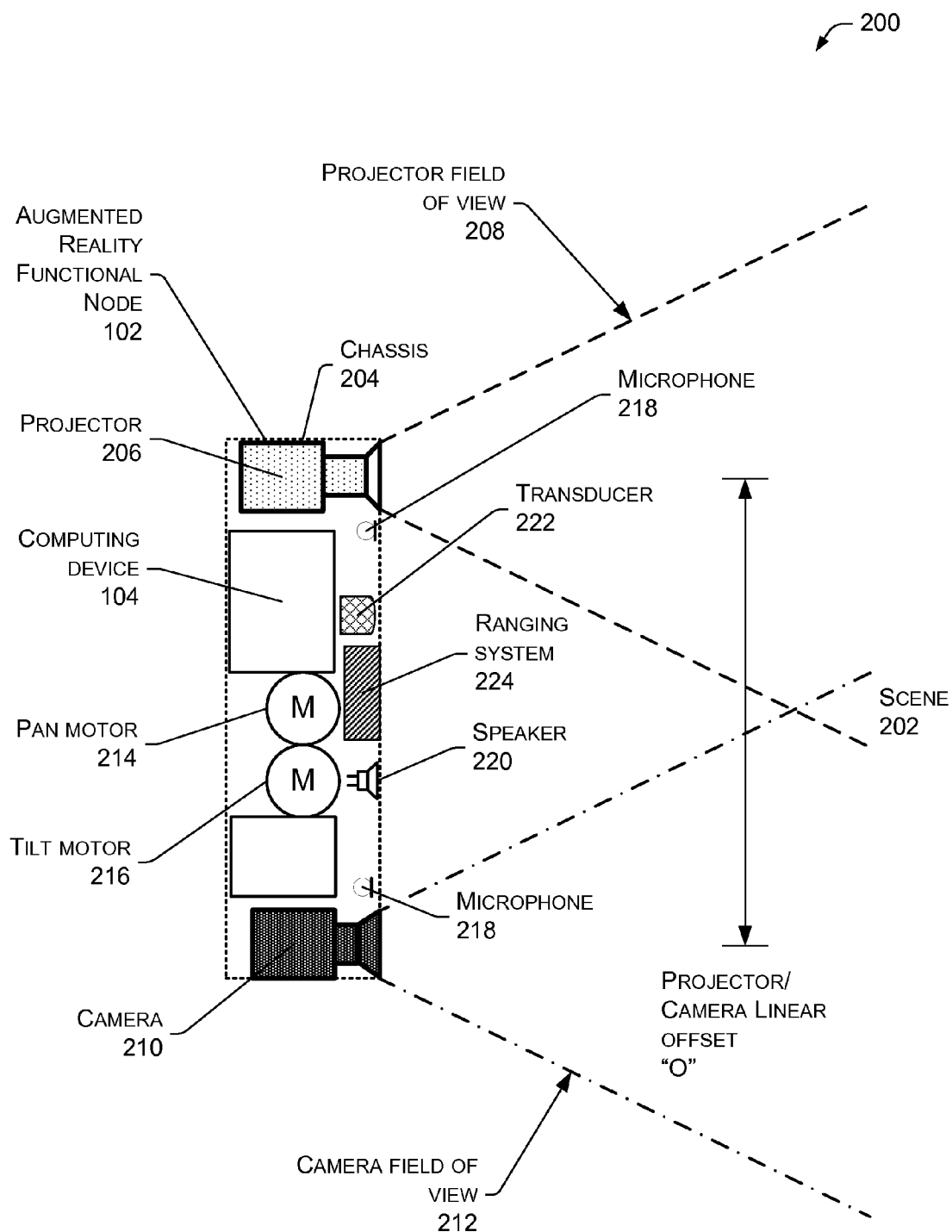
FIG. 2 shows an illustrative augmented reality functional node and selected computing device, along with other selected components.

FIG. 2 shows an illustrative schematic 200 of the augmented reality functional node 102 and selected components. The ARFN 102 is configured to scan at least a portion of a scene 202 and the objects therein. The ARFN 102 may also be configured to provide augmented reality output, such as images, sounds, and so forth.

A chassis 204 holds the components of the ARFN 102. Within the chassis 204 may be disposed a projector 206 that generates and projects images into the scene 202. These images may be visible light images perceptible to the user, visible light images imperceptible to the user, images with non-visible light, or a combination thereof. This projector 206 may be implemented with any number of technologies capable of generating an image and projecting that image onto a surface within the environment. Suitable technologies include a digital micromirror device (DMD), liquid crystal on silicon display (LCOS), liquid crystal display, 3LCD, and so forth. The projector 206 has a projector field of view 208 which describes a particular solid angle. The projector field of view 208 may vary according to changes in the configuration of the projector. For example, the projector field of view 208 may narrow upon application of an optical zoom to the projector. In some implementations, a plurality of projectors 206 may be used.

A camera 210 may also be disposed within the chassis 204. The camera 210 is configured to image the scene in visible light wavelengths, non-visible light wavelengths, or both. The camera 210 has a camera field of view 212 which describes a particular solid angle. The camera field of view 212 may vary according to changes in the configuration of the camera 210. For example, an optical zoom of the camera may narrow the camera field of view 212. In some implementations, a plurality of cameras 210 may be used.

The chassis 204 may be mounted with a fixed orientation, or be coupled via an actuator to a fixture such that the chassis 204 may move. Actuators may include piezoelectric actuators, motors, linear actuators, and other devices configured to displace or move the chassis 204 or components therein such as the projector 206 and/or the camera 210. For example, in one implementation the actuator may comprise a pan motor 214, tilt motor 216, and so forth. The pan motor 214 is configured to rotate the chassis 204 in a yawing motion. The tilt motor 216 is configured to change the pitch of the chassis 204. By panning and/or tilting the chassis 204, different views of the scene may be acquired. The spatial analysis module 114 may use the different views to monitor objects within the environment.

One or more microphones 218 may be disposed within the chassis 204, or elsewhere within the scene. These microphones 218 may be used to acquire input from the user, for echolocation, location determination of a sound, or to otherwise aid in the characterization of and receipt of input from the scene. For example, the user may make a particular noise, such as a tap on a wall or snap of the fingers, which are pre-designated as attention command inputs. The user may alternatively use voice commands. Such audio inputs may be located within the scene using time-of-arrival differences among the microphones and used to summon an active zone within the augmented reality environment.

One or more speakers 220 may also be present to provide for audible output. For example, the speakers 220 may be used to provide output from a text-to-speech module or to playback pre-recorded audio.

A transducer 222 may be present within the ARFN 102, or elsewhere within the environment, and configured to detect and/or generate inaudible signals, such as infrasound or ultrasound. These inaudible signals may be used to provide for signaling between accessory devices and the ARFN 102.

A ranging system 224 may also be provided in the ARFN 102. The ranging system 224 is configured to provide distance information from the ARFN 102 to a scanned object or set of objects. The ranging system 224 may comprise radar, light detection and ranging (LIDAR), ultrasonic ranging, stereoscopic ranging, and so forth. In some implementations the transducer 222, the microphones 218, the speaker 220, or a combination thereof may be configured to use echolocation or echo-ranging to determine distance and spatial characteristics.

In this illustration, the computing device 104 is shown within the chassis 204. However, in other implementations all or a portion of the computing device 104 may be disposed in another location and coupled to the ARFN 102. This coupling may occur via wire, fiber optic cable, wirelessly, or a combination thereof. Furthermore, additional resources external to the ARFN 102 may be accessed, such as resources in another ARFN 102 accessible via a local area network, cloud resources accessible via a wide area network connection, or a combination thereof.

Also shown in this illustration is a projector/camera linear offset designated "O". This is a linear distance between the projector 206 and the camera 210. Placement of the projector 206 and the camera 210 at distance "O" from one another aids in the recovery of structured light data from the scene. The known projector/camera linear offset "O" may also be used to calculate distances, dimensioning, and otherwise aid in the characterization of objects within the scene 202. In other implementations the relative angle and size of the projector field of view 208 and camera field of view 212 may vary. Also, the angle of the projector 206 and the camera 210 relative to the chassis 204 may vary.

In other implementations, the components of the ARFN 102 may be distributed in one or more locations within the environment 100. As mentioned above, microphones 218 and speakers 220 may be distributed throughout the scene. The projector 206 and the camera 210 may also be located in separate chassis 204. The ARFN 102 may also include discrete portable signaling devices used by users to issue command attention inputs. For example, these may be acoustic clickers (audible or ultrasonic), electronic signaling devices such as infrared emitters, radio transmitters, and so forth.

Figure 3:
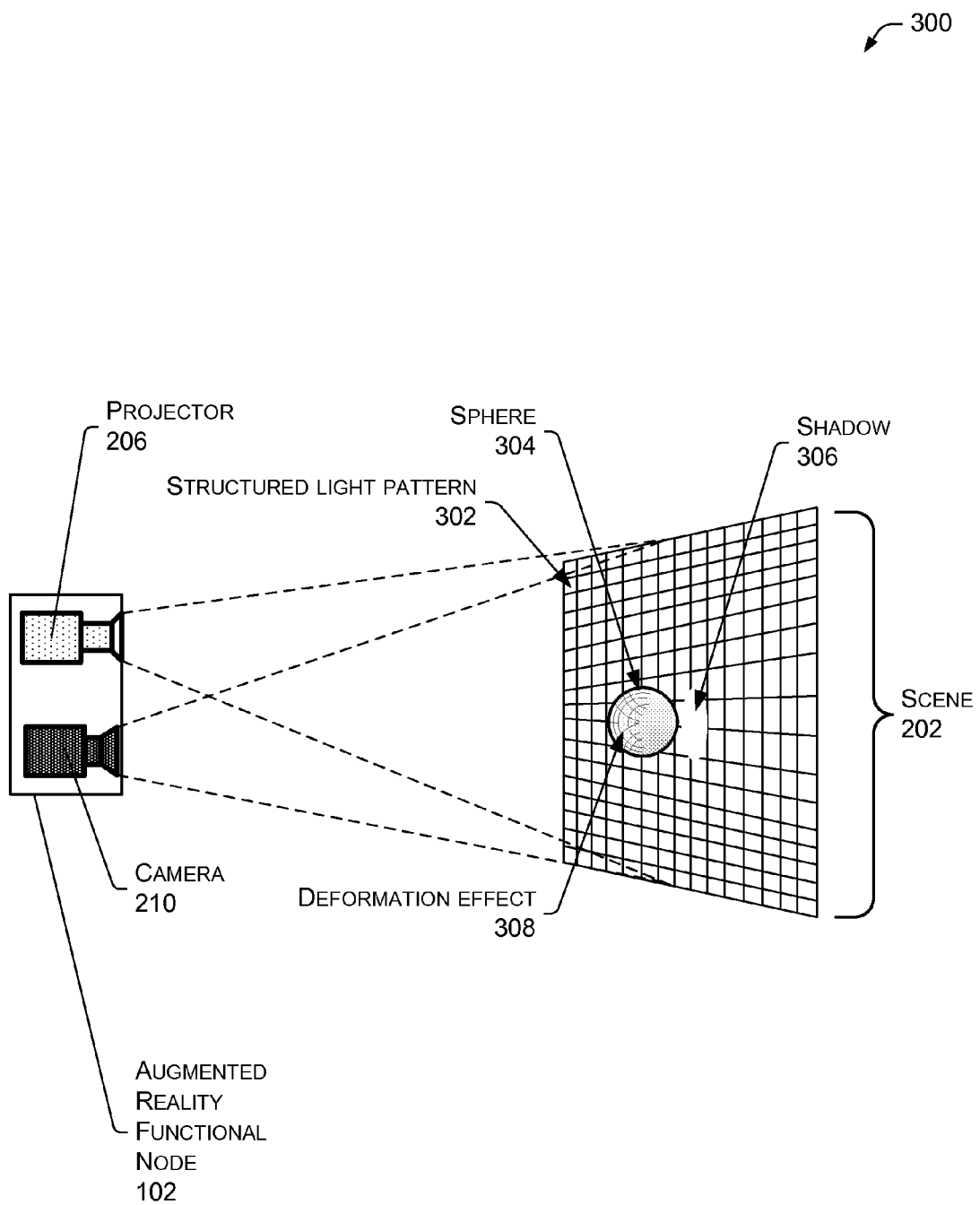
FIG. 3 illustrates the augmented reality functional node projecting a structured light pattern on a scene and receiving a corresponding image of the scene.

FIG. 3 illustrates a structured light pattern 300 impinging on the scene. In this illustration, the projector 206 within the ARFN 102 projects a structured light pattern 302 onto the scene 202. In some implementations a sequence of different structure light patterns 302 may be used. This structured light pattern 302 may be in wavelengths which are visible to the user, non-visible to the user, or a combination thereof. The structured light pattern 304 is shown in this example, but not by way of limitation, as a grid. In other implementations other patterns, such as bars, dots, pseudorandom noise, and so forth may be used. Pseudorandom noise (PN) patterns are particularly useful because a particular point within the PN pattern may be specifically identified. A PN function is deterministic in that given a specific set of variables, a particular output is defined. This deterministic behavior allows the specific identification and placement of a point or block of pixels within the PN pattern.

A sphere 304 is shown positioned between the projector 206 and a wall in the scene 202. A shadow 306 from the sphere 304 appears on the wall. Inspection of the sphere 304 shows a deformation effect 308 of the structured light pattern 302 as it interacts with the curved surface of the sphere 304.

This deformation effect 308 is detected by the camera 210. The camera 210 is configured to sense or detect the structured light. In some implementations, the camera 210 may also sense or detect wavelengths other than those used for structured light pattern 302. The image captured by the camera 210 is processed by the spatial analysis module 114 to characterize the scene 202. In some implementations, multiple cameras may be used to acquire the image.

The actual size of the sphere 304 in this example may not be readily determined based upon the geometry of the ARFN 102, diameter of the sphere 304, distance between the ARFN 102 and the sphere 304, and so forth. As a result, the spatial analysis module 114 may be configured to make one or more assumptions about the scene, and test those assumptions to constrain the dimensions of the scene 202.

Figure 4:
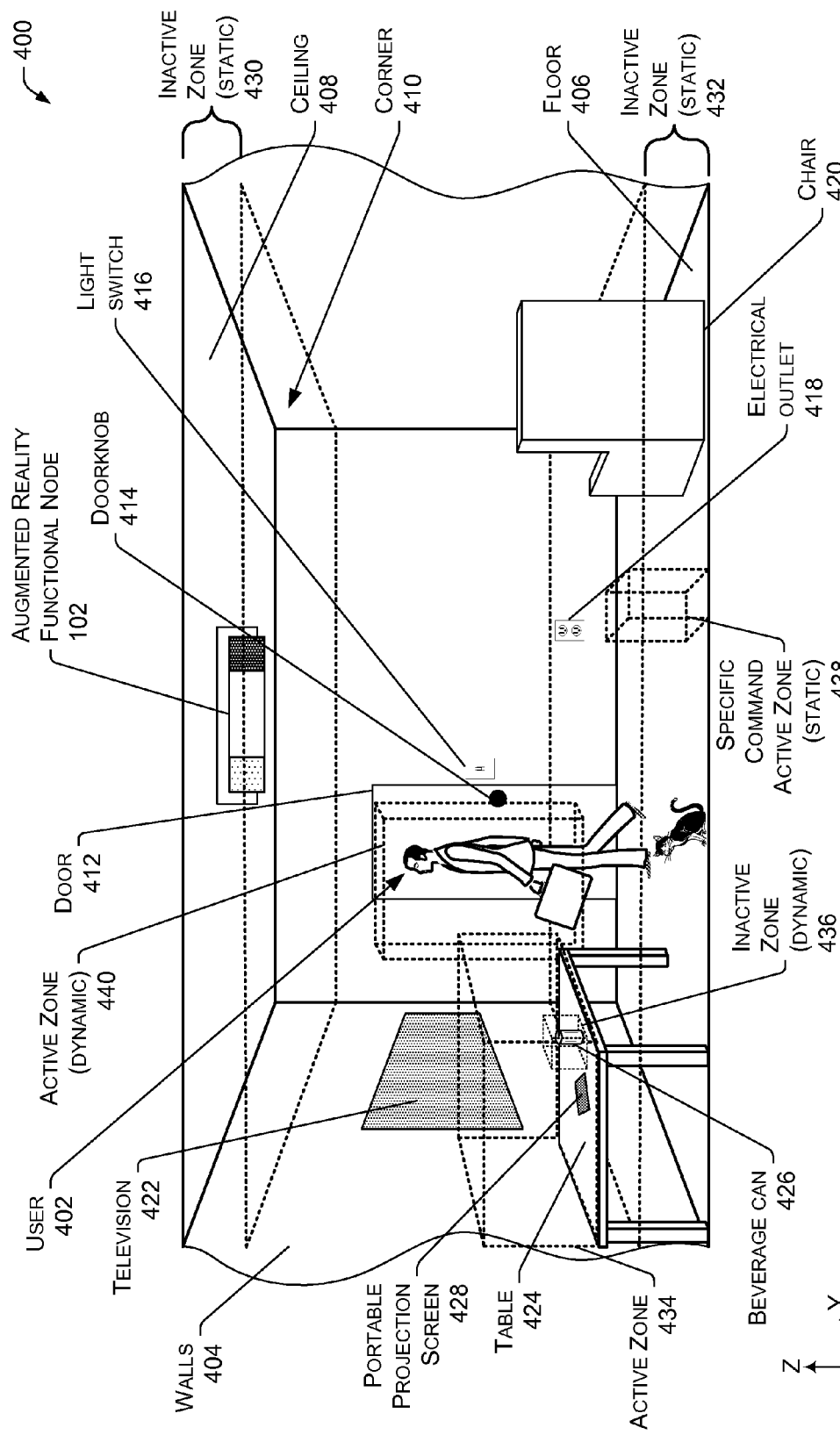
FIG. 4 is a detailed perspective view of an illustrative scene and augmented reality environment indicating the relative placement of physical objects and designated active and inactive zones.

FIG. 4 is a detailed perspective view 400 of a scene and augmented reality environment. In this illustration, the scene comprises a room with a user 402 and is part of an augmented reality environment. While a single user 402 is shown, it is understood that the augmented reality environment may support multiple users. Within this room the ARFN 102 is positioned approximately mid-ceiling. Walls 404, a floor 406, and a ceiling 408 bound the room. Within this room are corners 410 and a door 412 with a doorknob 414.

Positioned adjacent to the doorknob 414 on the wall 404 is a light switch 416. Also on the wall is an electrical outlet 418. Sitting in one corner of the room on the floor is a chair 420 suitable for a single adult person. Disposed on one of the walls 404 is a television 422 or computer display. Sitting in another corner of the room is a table 424. Resting upon the table is a beverage can 426 and a portable projection screen 428.

Within the room the tracking and control module 124 has designated several zones. The boundaries of these zones are shown in this and the following illustrations as broken lines. A static inactive zone 430 is designated for a layer of volume proximate to the ceiling 408. The height of this zone may be determined based at least in part upon the height of the users 402 within the room. For example, when a very tall user enters, the height of a bottom edge of the inactive zone 430 may be increased relative to the floor.

Another static inactive zone 432 is shown for a layer of volume proximate to the floor. As above, the height of this inactive zone 432 may vary according to the users and other objects in the environment. For example, where small animals such as cats or dogs may be in the environment, the height of the inactive zone 432 may be increased such that the movement of these animals is not scanned or processed.

An active zone 434 is associated with a volume above the table 424. Different types of zones may be designated within one another. For example, within the active zone 434 associated with the table 424, a dynamic inactive zone 436 is associated with the beverage can. This dynamic inactive zone 436 prevents the augmented reality system from attempting to interpret the motions of the user's 402 fingers while grasping the can, and so forth. This inactive zone 436 may be overridden depending upon the configuration of the tracking and control module 124. For example, the user 402 may let go of the beverage can 426 but keep their hand within the inactive zone 436 and issue an attention command input such as snapping his fingers to make the area around his hand an active zone. In this case, the inactive zone 436 may be discontinued for the duration of the existence of the newly summoned active zone, or until the newly summoned active zone moves a pre-determined distance away from the beverage can 426.

Active zones may be configured to perform particular pre-assigned functions, known as specific command active zones. For example, a static specific command active zone 438 is shown in the environment which may be configured to act as a virtual trash can. Virtual objects which are "thrown" or otherwise directed into the virtual trash associated with this particular active zone 438 may thus be deleted. In other implementations the active zone 438 of the virtual trash may coincide with the volume of an actual trash receptacle in the scene.

Zones may be configured to track particular objects, or portions of particular objects. In one implementation, a dynamic active zone 440 may be configured to follow a portion of the user 402, such as the upper torso, arms, and head. As the user 402 walks about the room, the active zone 440 follows the user.

The ARFN 102 may be configured to provide an augmented reality experience to users within the room. For example, the user 402 may wish to have a set of notes from a recent meeting projected upon the portable projection screen 428 for reference while viewing a high resolution photograph on the television 422. The ARFN 102 may be configured such that sounds, motions of the user 402, motions of objects, or a combination thereof within the active zones are recognized as input, allowing interaction with virtual or computer generated items.

Figure 5:
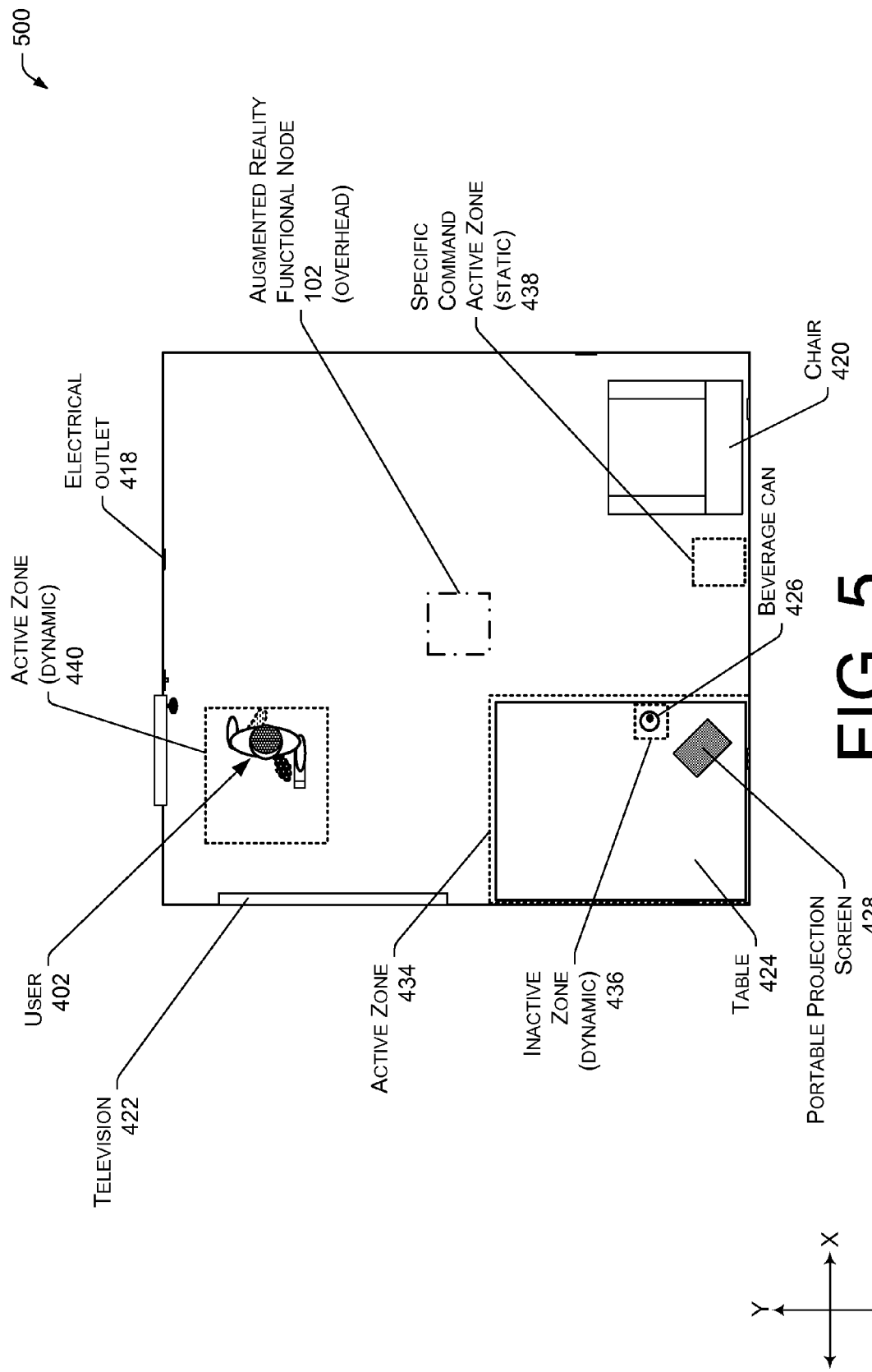
FIG. 5 is a plan view of the scene and augmented reality environment of FIG. 4, illustrating several zones.

FIG. 5 is a plan view 500 of the augmented reality environment of FIG. 4, illustrating some of the zones. As shown here, the active zone 440 is configured to encompass, track, and follow the user, and the inactive zone 436 associated with the beverage can 426 is within the active zone 434 of the table 424. The volume of the active zone 440 is thus scanned for user input.

Figure 6:
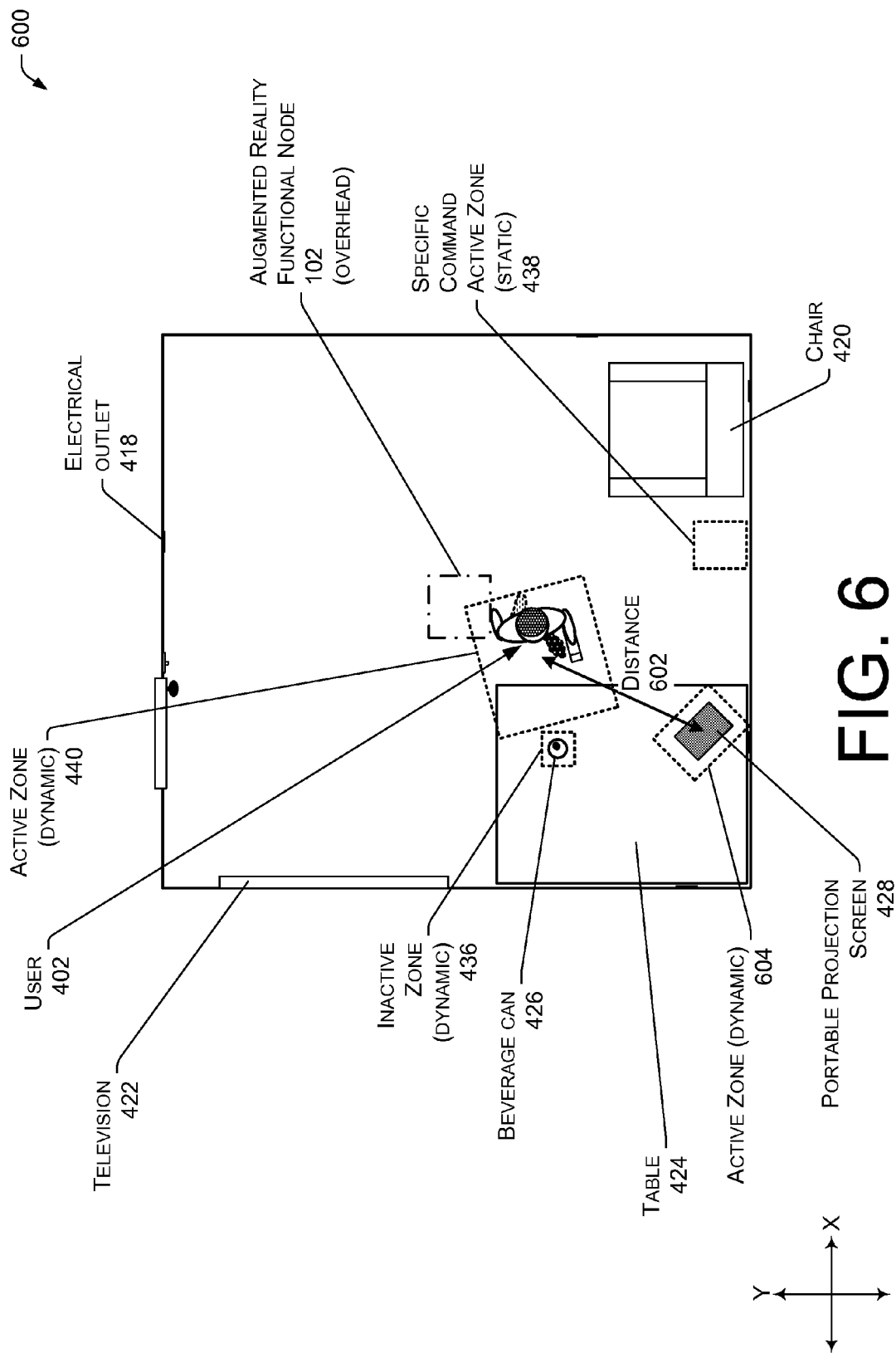
FIG. 6 is a plan view of the scene and augmented reality environment of FIG. 4, illustrating several of the zones associated with and tracking particular objects.

FIG. 6 is a plan view 600 of the augmented reality environment of FIG. 4, illustrating distance sensitive zone designation. In this example, the user 402 has approached the table 424. The dynamic active zone 440 which is associated with the user 402 tracks the user 402 as he moves to the table 424. When the dynamic active zone 440 or the user 402 is within a pre-determined distance 602 of other objects, specific zones may be activated. Thus, as shown here, when the user 402 is within distance 602 of the portable projection screen 428, the tracking and control module 124 designate the volume encompassing the portable projection screen 428 as a dynamic active zone 604. Also, because of the proximity of the user 402 or the user's active zone 440, the inactive zone 436 associated with the beverage can 426 has been enabled.

Figure 7:
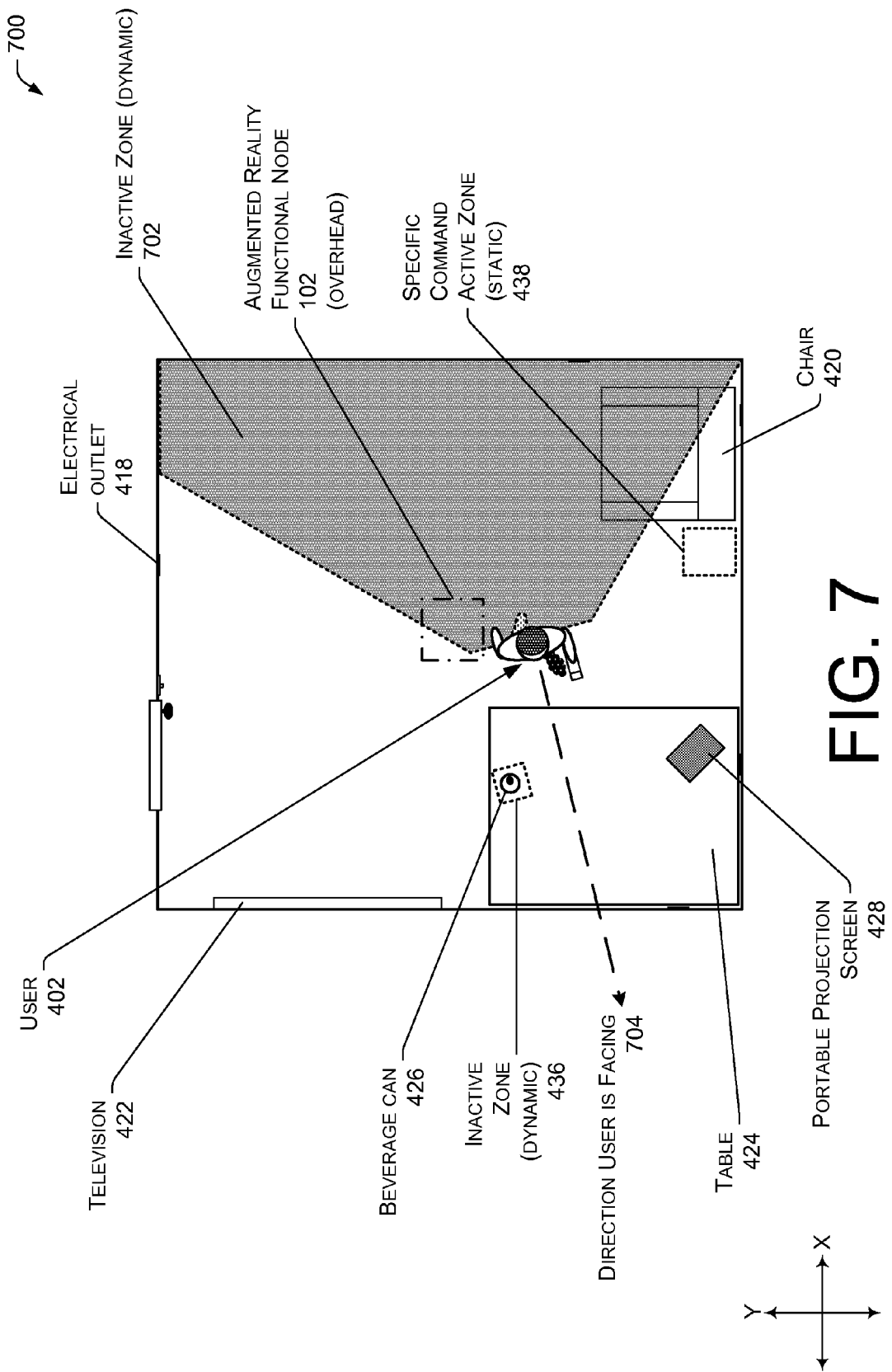
FIG. 7 is a plan view of the scene and augmented reality environment of FIG. 4, illustrating designation of a zone behind the user as an inactive zone.

FIG. 7 is a plan view 700 of the augmented reality environment of FIG. 4, illustrating the designation of a zone behind the user 402 as an inactive zone. Where multiple users are present in the environment, the inactive zone may be a union of the areas behind the users. For example, the volume behind a group of users 402 standing in the room and all watching the television 422 may be designated as inactive because it coincides across all members of the group.

In some implementations, it may be desired to designate explicit inactive zones and consider the remainder to as an active zone. In this illustration, an inactive zone 702 "shadow" extends behind the user to the limits of the scene. The direction and placement of the inactive zone 702 may be determined at least in part by a direction the user is facing 704, such as determined by the spatial analysis module 114.

In other implementations, the active zone 440 associated with the user 402 may be configured in a pre-determined geometry, such as a cylinder, extending for a pre-determined distance from the user 402. The remaining volume within the environment 100 may then be deemed an inactive zone.

The boundaries of the active and inactive zones do not impede the user 402 from interacting with physical or virtual objects at a distance. For example, the user may "grab" a virtual object such as a graphical window containing text and "throw" that virtual object to another wall well outside the user's 402 active zone.

Active and inactive zones may merge or split. For example, a first active zone around a first portable projection screen 428 may merge with a second active zone around a second portable projection screen 428 when the two are placed in a stack.

Figure 8:
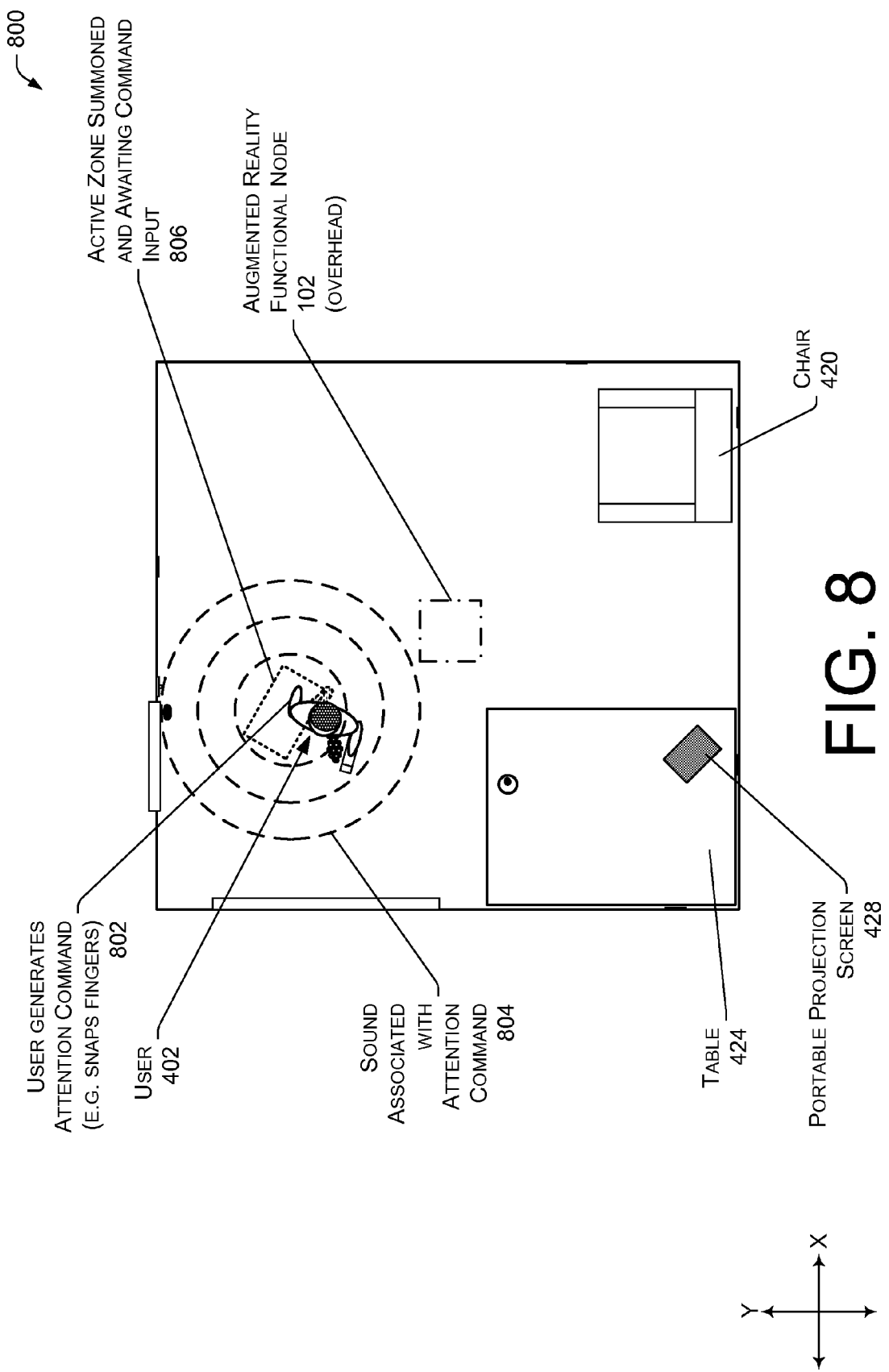
FIG. 8 is a plan view of the scene and augmented reality environment of FIG. 4, illustrating the user summoning an active zone by generating an attention command such as snapping his fingers.

FIG. 8 is a plan view 800 of the augmented reality environment of FIG. 4, illustrating the user summoning an active zone by generating an attention command. As shown here, the user 402 generates an attention comment input 802 by snapping his fingers on his right hand. The sound 804 associated with the attention command input propagates from the user's hand to the ARFN 102 or components thereof, such as microphones placed within the environment 100. The tracking and control module 124 interprets the sound as an attention command input, and designates a volume around the origin of the sound as an active zone 806. This active zone 806 is then monitored for other inputs. Thus, the user may snap his fingers and proceed to enter other commands such as initiating a call, opening a virtual folder, and so forth.

Figure 9:
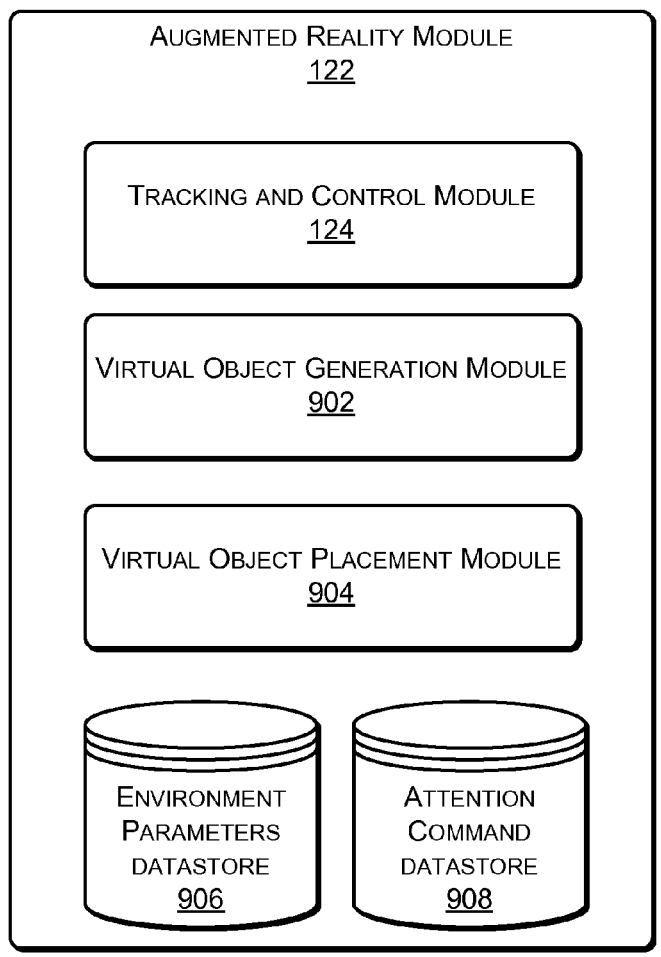
FIG. 9 is a diagram of an illustrative augmented reality module.

FIG. 9 is a diagram 900 of an illustrative augmented reality module. The augmented reality module 122 may comprise the tracking and control module 124 as described above. A virtual object generation module 902 is configured to generate virtual objects such as visual output, sounds, and so forth. A virtual object placement module 904 is configured to use spatial information from the spatial analysis module 114 to place virtual objects within the physical scene in appropriate locations, map virtual objects to physical objects, and so forth.

The augmented reality module 122 may maintain and access an environment parameters datastore 906 and an attention command datastore 908. The environment parameters datastore 906 contains data about active and inactive zones which is used by the tracking and control module 124 to determine how to allocate system resources to the volumes within the environment 100. These resources may be located within the ARFN 102, other devices on the local area network, or in the cloud accessible via a wide area network. The environment parameters are discussed in more detail below with regards to FIG. 10.

The attention command datastore 908 contains data about signals, sounds, gestures, and so forth which are intended to summon the attention of the augmented reality system and initiate an active zone. The attention command datastore 908 are discussed in more detail below with regards to FIG. 11.

Figure 10:
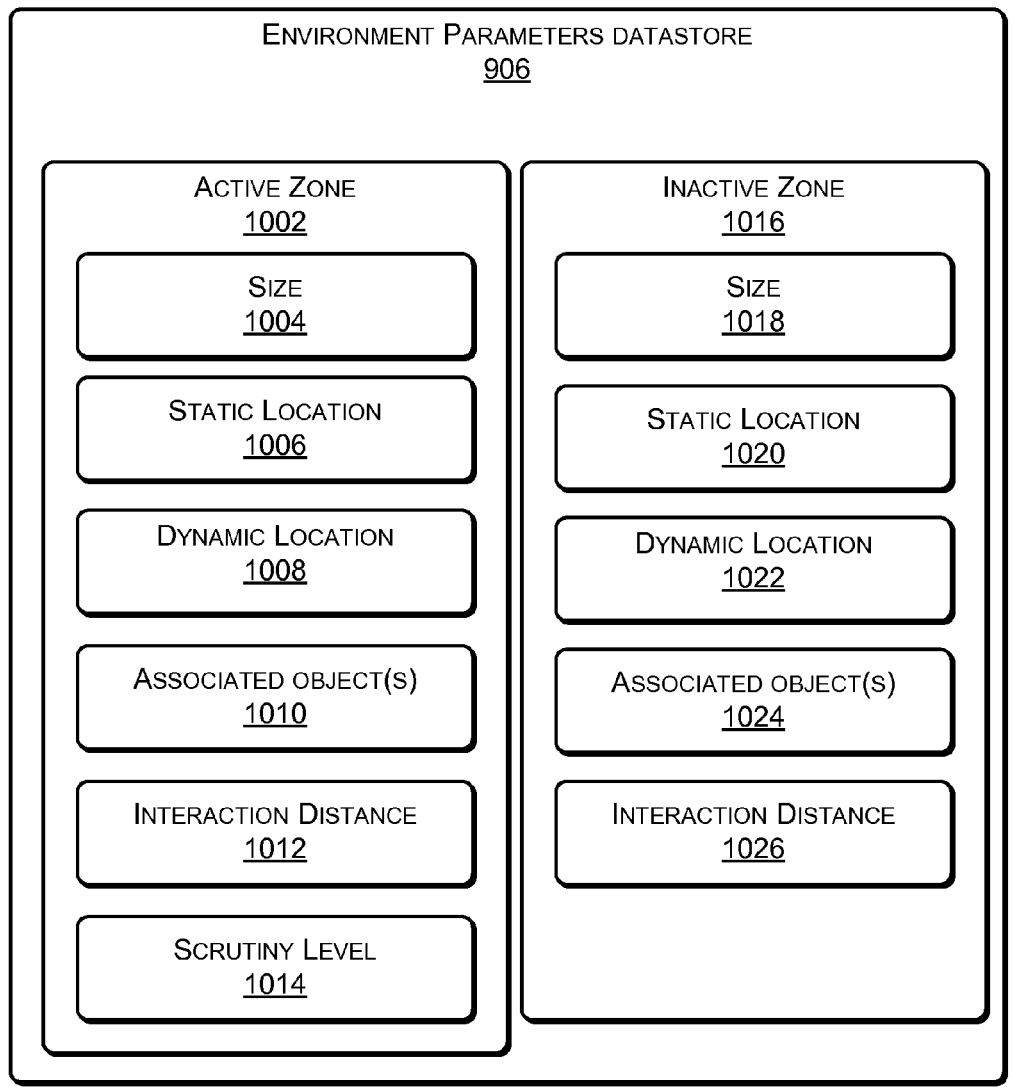
FIG. 10 illustrates a datastore of environment parameters which describe location and attributes of zones within the augmented reality environment.

FIG. 10 is a diagram 1000 of illustrative environment parameters in a datastore which describe location and attributes of zones within the environment. Resources are more efficiently utilized by focusing augmented reality system resources on active zones, and fewer or no resources upon inactive zones. Within the environment parameters datastore 906 are active zone 1002 parameters. These parameters include a size of volume to be enclosed 1004. A static location 1006, if any, indicates a particular point in space within the environment 100 which the active zone 1002 is anchored to. Thus, the active zones 1002 may be designated for a particular area and remain fixed to that area until this parameter is changed.

The active zones 1002 may also have dynamic locations 1008. The dynamic locations 1008 may be anchored to one or more associated objects 1010. For example, the active zone 440 is dynamically associated with the user 402.

The size 1004 of the zone 1002 associated with the one or more associated objects 1010 may be proportionate to the function of the object. For example, the active zone of the portable projection screen 428 may be small when the object is used for reading, but larger when the function has been changed to allow the user to "draw" on the portable projection screen 428.

The active zone 1002 may also have an interaction distance 1012. The interaction distance 1012 specifies a minimum physical separation at which a plurality of zones will interact. This interaction may include activating, merging, separating, or discontinuing one of the interacting zones. For example, as shown above with regards to FIG. 6, when the user 402 approached within distance 602 of the portable projection screen 428, the portable project screen's active zone 604 was enabled.

The active zone 1002 may also have an associated scrutiny level 1014. The scrutiny level 1014 allows for more specific assignment of system resources to a particular active zone 1002. For example, the specific command active zone 438 may be set at a low scrutiny, calling for minimal scanning as to whether a physical object or token associated with a virtual object has been placed within the volume of the active zone 438. In contrast, the active zone 604 associated with the portable projection screen 428 may be configured to receive high scrutiny using high resolution scanning to detect more subtle movements such as finger motions.

Parameters for an inactive zone 1016 may also be stored within the environment parameters datastore 906. The inactive zone 1016 may also have a size 1018, a static location 1020 or dynamic location 1022, one or more associated objects 1024, and an interaction distance 1026 similar to that described above with regards to the active zone 1002. For example, the inactive zone 1016 may be dynamically associated with a particular object, such as the inactive zone 436 associated with the beverage can 426.

Figure 11:
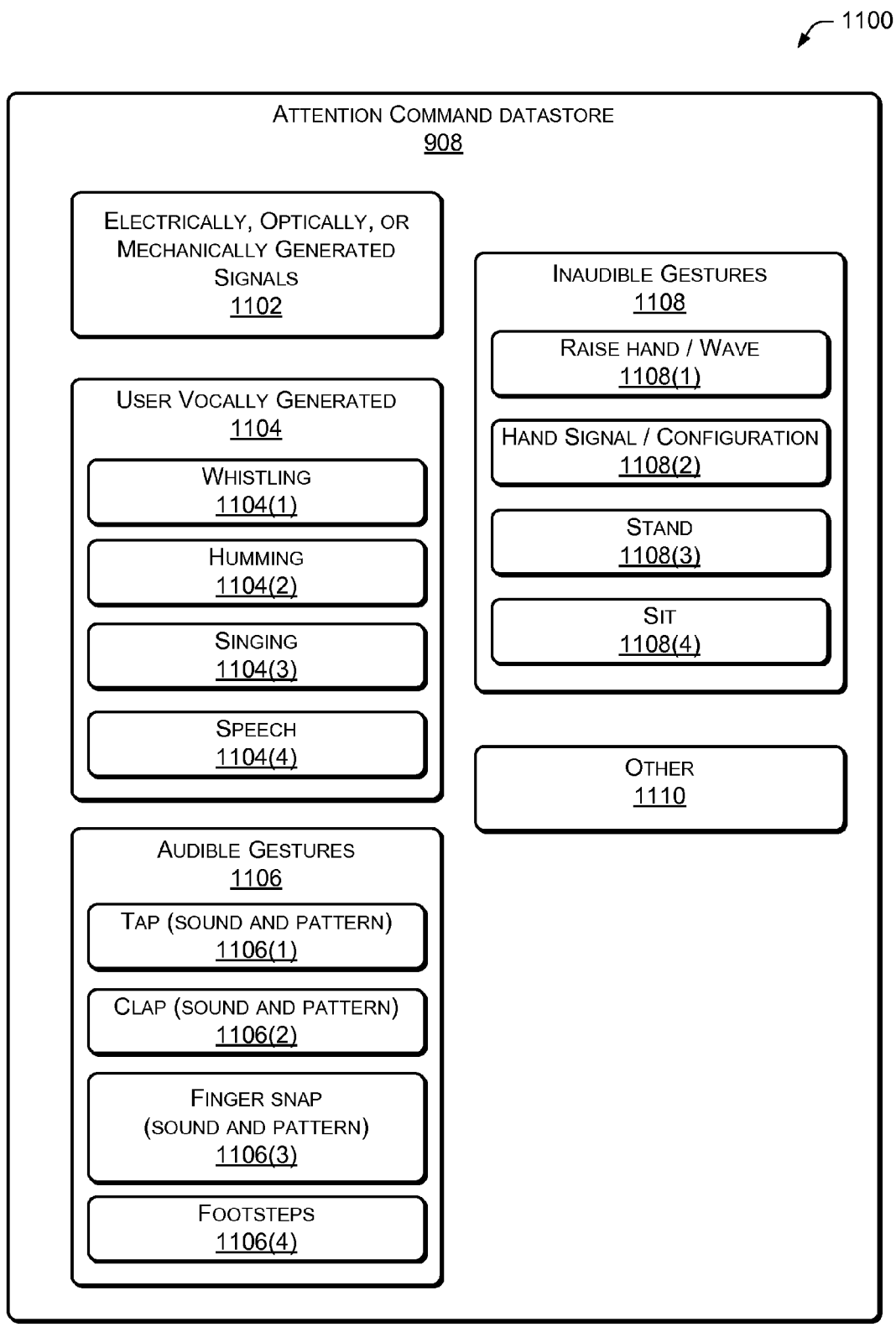
FIG. 11 illustrates a datastore of attention commands which may be used to initiate an active zone within the augmented reality environment.

FIG. 11 is a diagram of illustrative attention commands within a datastore 908 which may be used to initiate an active zone within the augmented reality environment. The attention command inputs summon an active zone into an otherwise inactive zone. Once summoned, the active zone is allocated appropriate system resources to accept other inputs. In effect, the attention command allows the user to call the attention of the augmented reality system.

Signals generated electrically, optically, mechanically, or by other means 1102 may be used as attention commands. These signals 1102 may include radio, light including infrared, clicks, and so forth. For example, a device such as the portable projection screen 428 may incorporate several buttons which when activated send an electromagnetic, acoustic or other generated signal 1102 to the ARFN 102. These signals may be generated in a non-electronic fashion. For example, a mechanical clicker may produce a specific sound which is designated as an attention command signal. The sound may be audible or inaudible such as infrasound or ultrasound.

The attention command may also be a user vocally generated 1104 signal. The microphones 218 coupled to the ARFN 102 may then receive these audible signals. By using a plurality of microphones it is possible to acoustically locate the approximate source of the sound within the scene. These user vocally generated 1104 signals may include whistling 1104(1), humming 1104(2), singing 1104(3), or speaking 1104(4). Other user vocally generated 1104 sounds may also be used, such as breathing noises, coughing, and so forth.

Audible gestures 1106 may also be used as attention commands and stored within the datastore 908. Audible gestures include physical actions by the user which result in an audible output. These include tapping 1106(1), clapping 1106(2), fingersnapping 1106(3), footsteps 1106(4), and so forth.

Where at least minimal scanning, such as to detect gross motions, is taking place, inaudible gestures 1108 may also be designated as attention commands. The inaudible gestures 1108 may include a raised hand or wave 1108(1), hand signal or configuration 1108(2), transitioning to a standing posture 1108(3), transitioning to a sitting posture 1108(4), and so forth.

Other signals 1110 may be used as attention commands. Additionally, a combination of signals, specific temporal sequence of signals, and so forth may be designated as the attention command. For example the fingersnap 1106(3) and the raised hand 1108(1) in that sequence may be designated as the attention command.

Illustrative Processes of Maintaining Active Zones

The processes described herein may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented on other architectures as well.

Figure 12:
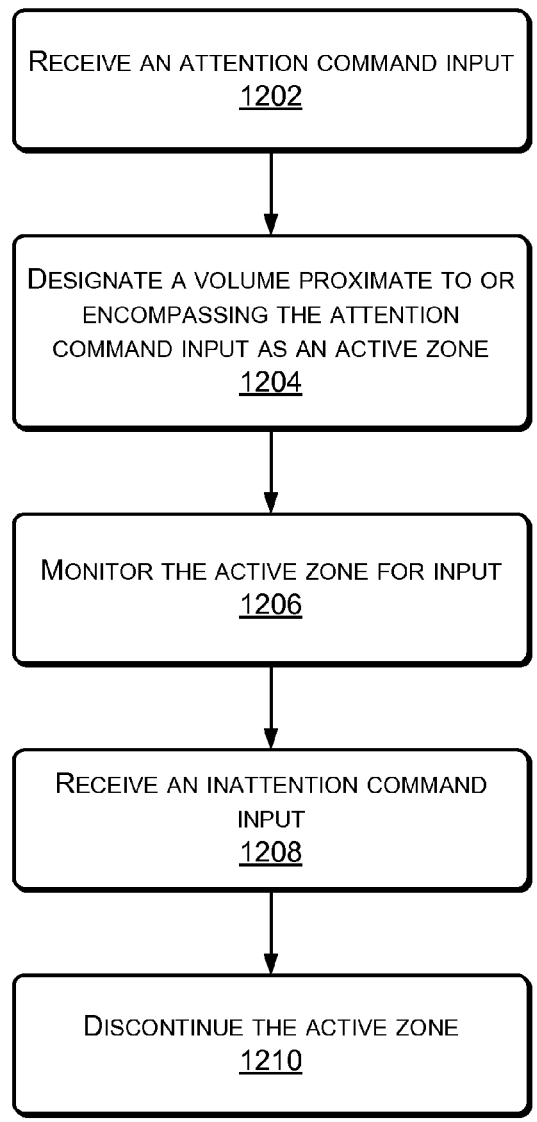
FIG. 12 is an illustrative process of receiving an attention command input and designating an active zone within the augmented reality environment.

FIG. 12 is an illustrative process 1200 of receiving an attention command input and designating an active zone within the augmented reality environment 100. At 1202, an attention command input is received. For example, the microphones 218 within the ARFN 102 may detect an audible finger snap 1106(3) which was previously designated as an attention command input.

At 1204, a volume is designated as an active zone. This may be a volume at a pre-determined position within the environment, or may be proximate to or encompassing the attention command input source. At 1206, the active zone is monitored for input. For example, the active zone may be scanned for hand gestures which are associated with other commands. As described above, the augmented reality environment may contain a plurality of active zones.

At 1208, an inattention command input is received. For example, a particular inaudible hand configuration 1108(2) or a second audible finger snap 1106(3) is received and processed by the tracking and control module 124.

At 1210, the active zone is discontinued at least partly in response to the inattention command input. This discontinuance prevents inadvertent action by the augmented reality system and also frees up system resources.

Figure 13:
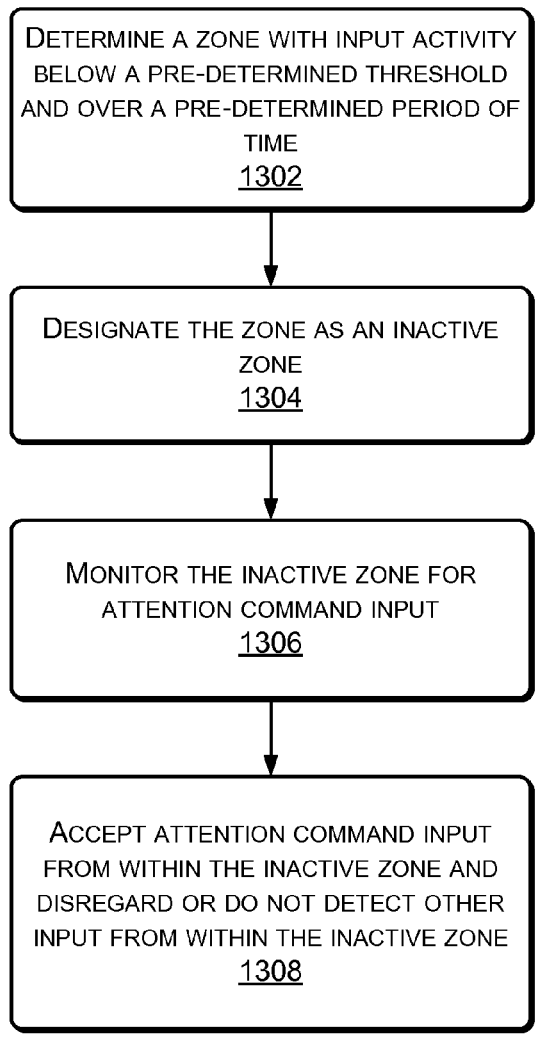
FIG. 13 is an illustrative process of designating low activity region within the augmented reality environment as an inactive zone.

FIG. 13 is an illustrative process 1300 of designating a low activity region within the augmented reality environment as an inactive zone. At 1302, a zone with input activity below a pre-determined threshold and over a pre-determined period of time is determined. For example, the layer of space proximate to a high ceiling may have few or no inputs made over the span of a day.

At 1304, the zone is designated as an inactive zone. As a result, the tracking and control module 124 disregards inputs other than attention command signals from this zone. Other inputs are disregarded or the volume is not scanned, which reduces system utilization. In some implementations all inputs including attention command inputs may be ignored. For example, in a particularly noise environment such as a convention hall, an inactive zone designated from three meters above ground level to the ceiling may be configured such that audible attention command input located within are disregarded.

At 1306 the inactive zone is monitored for an attention command input. For example, the spatial analysis module 114 may be configured to avoid scanning the inactive zone with structured light. However, microphones would still detect an audible attention command input signal from the inactive zone.

At 1308, the attention command input is accepted from within the inactive zone. However, as mentioned above, within the inactive zone other inputs are either disregarded or not detected. The user was thus able to summon the active zone within a pre-determined inactive zone.

Figure 14:
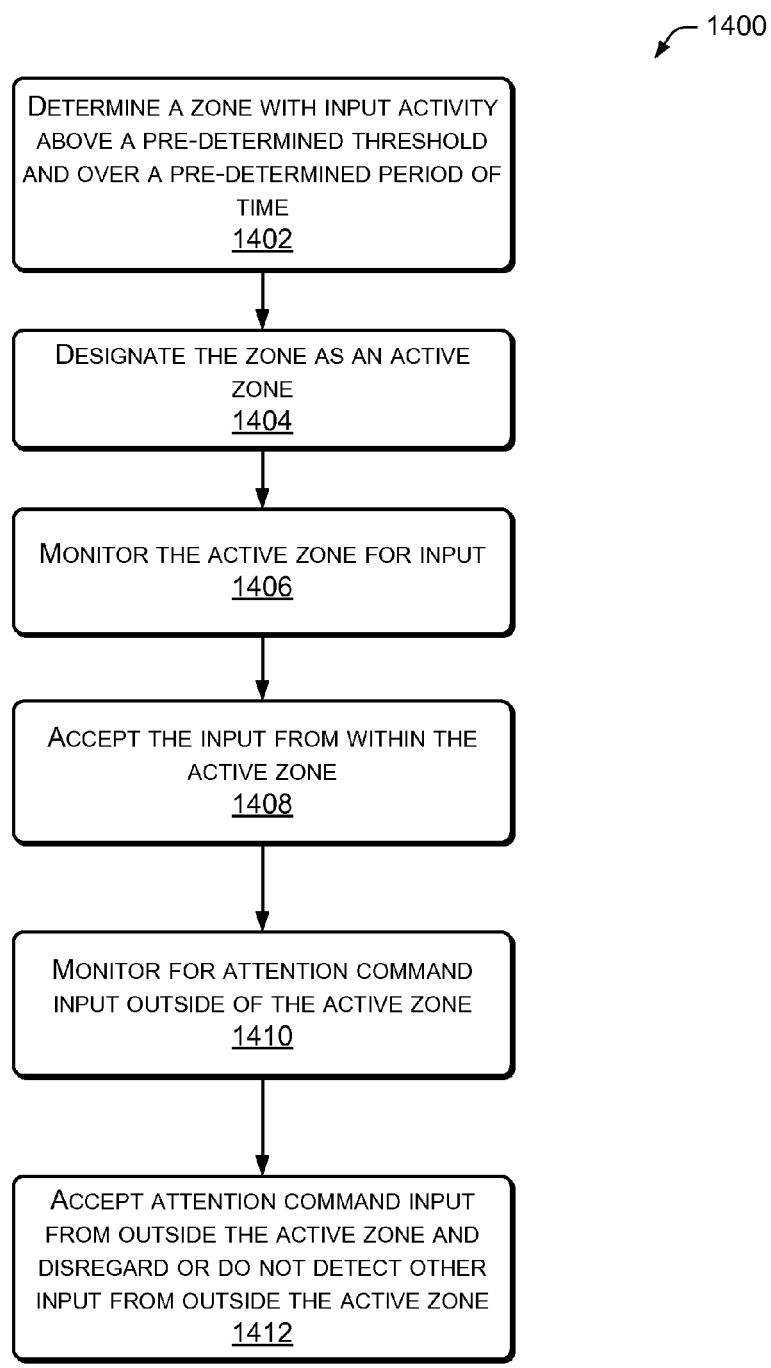
FIG. 14 is an illustrative process of designating high activity region within the augmented reality environment as an active zone.

It may be useful in some implementations to designate a particular zone as an active zone. FIG. 14 is an illustrative process 1400 of designating high activity region within the augmented reality environment as an active zone. At 1402, a zone with input activity above a pre-determined threshold and over a pre-determined period of time is determined. For example, the volume over the table 424 may frequently receive user inputs as the user 402 interacts with objects both real and virtual on the table 424.

At 1404, the zone is designated as an active zone. As a result, the tracking and control module 124 allocates more system resources to the zone compared to those resources allocated to the inactive areas.

At 1406, the active zone is monitored for input. At 1408, input from within the active zone is accepted as received and processed by the tracking and control module 124.

At 1410, the volume outside of the active zone is monitored for attention command input. In some implementations, such as where the attention command input is an audible signal and microphones are used, the entire volume of the scene may be monitored.

At 1412, the attention command input from outside the active zone is accepted while other input from outside the active zone is disregarded or not detected. As above, this attention command input may then be used to summon an active zone for additional input.

Figure 15:
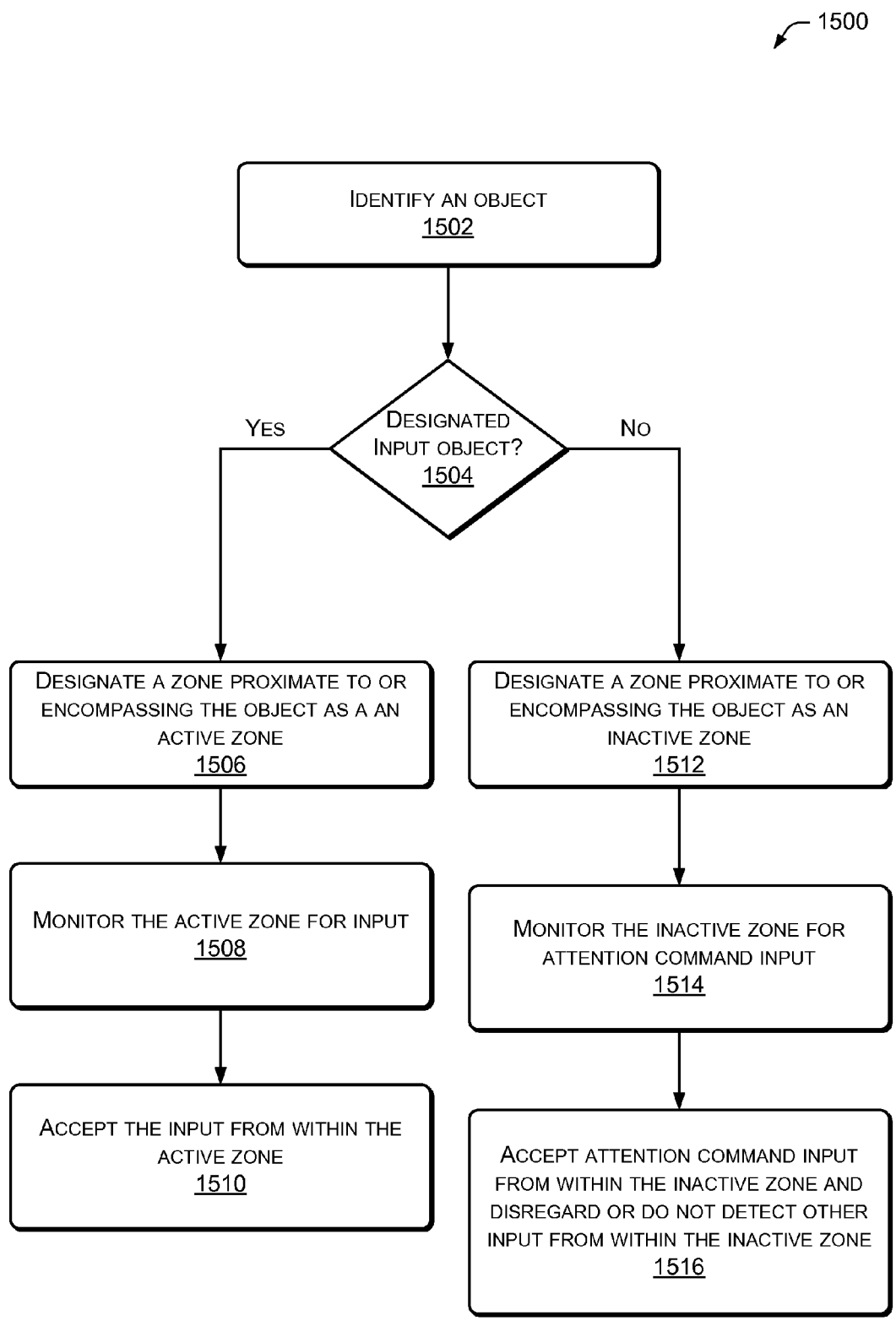
FIG. 15 is an illustrative process of associating and monitoring a zone with an object.

FIG. 15 is an illustrative process 1500 of associating a zone with an object and monitoring the object for input. At 1502, an object is identified. For example, the spatial analysis module 114 may identify the object. At 1504, a determination is made as to whether the object is a designated input object. Designated input objects are those which are configured to be used as input tools within the augmented reality environment. For example, the portable projection screen 428 may be configured within the augmented reality environment 100 to display information and also accept user input.

Non-designated input objects are those which are typically not used to input data to the augmented reality environment. For example, the beverage can 426 may be considered a non-designated input object so that motions of the can are not considered input.

When the object is determined to be a designated input object at 1504 (i.e., the "yes" branch from 1504), a zone is designated proximate to or encompassing the object as an active zone at 1506. For example, in FIG. 6, the active zone 604 is designated around the portable projection screen 428. At 1508, the active zone is monitored for input. At 1510, input from within the active zone is accepted.

When the object is not a designated input object at 1504 (i.e., the "no" branch from 1504), a zone proximate to or encompassing the object is designated as an inactive zone at 1512. At 1514, the inactive zone is monitored for attention command input. At 1516, an attention command input may be accepted from within the inactive zone and other input is disregarded or not detected within the inactive zone.

Figure 16:
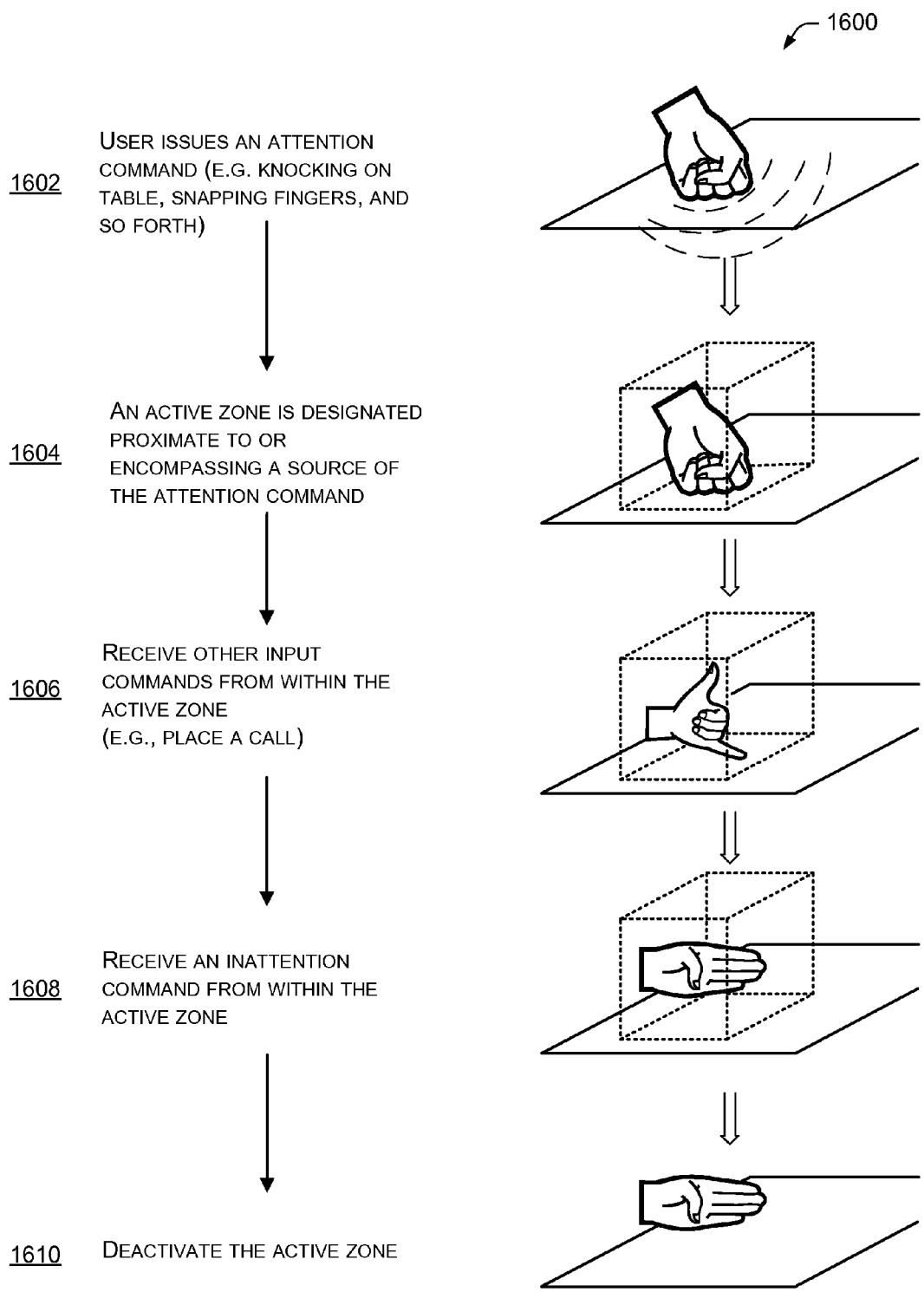
FIG. 16 is an illustrative scenario of a user summoning an active zone.

FIG. 16 is an illustrative scenario 1600 of a user summoning an active zone. In this scenario, operation 1602 shows the user issuing an attention command, such as knocking on the table 434. Operation 1604 shows an active zone which is designated proximate to or encompassing the source of the attention command, in this case, the hand of the user.

Operation 1606 shows the receipt of other input commands from within the active zone. For example, as shown here the user makes a "telephone" gesture to indicate they want to place a call.

Operation 1608 shows the user configuring their hand to form an inattention command within the active zone. Continuing the example, the user may be doing something else with his hands, such as sorting paperwork, and does not want those actions interpreted as commands.

Operation 1610 shows the deactivation of the active zone. The augmented reality system is no longer looking for specific inputs at the user's hand. However, as with operation 1602, the user may again summon an active zone by initiating another attention command input.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. An augmented reality functional node comprising:
   a processor;
   a projector and a camera coupled to the processor;
   a spatial analysis module configured to scan a scene;
   an augmented reality module configured to generate an augmented reality environment associated with the scene, the augmented reality module comprising:
   a tracking and control module configured to determine one or more zones with input activity above a pre-determined threshold and over a pre-determined period of time, designate the one or more zones as active zones and allocate scanning and interpretation resources to actions occurring within the one or more active zones to determine one or more user inputs.

2. The system of claim 1, wherein the active zone is designated upon receipt of a pre-determined attention command.

3. The system of claim 2, wherein the pre-determined attention command comprises an audible signal.

4. The system of claim 3, wherein a user at least in part generates the audible signal.

5. The system of claim 3, wherein the audible signal comprises human speech.

6. The system of claim 2, wherein the pre-determined attention command comprises a signal generated by a signaling device.

7. The system of claim 1, wherein the tracking and control module is further configured to designate one or more inactive zones and de-allocate scanning and interpretation resources within the one or more inactive zones while monitoring for attention command inputs from within the one or more inactive zones.

8. The system of claim 1, wherein the spatial analysis module is configured to scan the scene to sense inaudible input and one or more auditory sensors configured to sense audible input.

9. One or more non-transitory computer-readable media storing computer-executable instructions that, when executed, cause one or more processors to perform acts comprising:
   determining a zone within a scene with input activity below a pre-determined threshold and over a pre-determined period of time;
   designating the zone as an inactive zone;
   storing an indication that the zone is designated as an inactive zone;
   monitoring the inactive zone for an attention command input;
   accepting the attention command input from within the inactive zone and disregarding or not detecting other input from within the inactive zone.

10. The one or more non-transitory computer-readable storage media of claim 9, wherein the pre-determined threshold of input activity comprises a count of inputs received.

11. The one or more non-transitory computer-readable storage media of claim 9, wherein the monitoring the inactive zone comprises using a reduced scan rate, reduced set of sensors, or both compared to monitoring an active zone.

12. The one or more non-transitory computer-readable storage media of claim 9, further comprising:
   receiving the attention command input;
   designating a volume as an active zone within the inactive zone; and
   monitoring the active zone for input.

13. The one or more non-transitory computer-readable storage media of claim 12, wherein the volume of the active zone is proximate to or encompasses at least a portion of a source the attention command input.

14. The one or more non-transitory computer-readable storage media of claim 12, wherein the monitoring the active zone comprises a greater scan rate, additional set of sensors, or both compared to monitoring the inactive zone.

15. One or more non-transitory computer-readable media storing computer-executable instructions that, when executed, cause one or more processors to perform acts comprising:
   determining a zone with input activity above a pre-determined threshold and over a pre-determined period of time;
   designating the zone as an active zone;
   monitoring the active zone for input;
   accepting the input from within the active zone;
   monitoring for attention command input outside the active zone; and
   accepting the attention command input from outside the active zone and disregarding or not detecting other input from outside the active zone.

16. The one or more non-transitory computer-readable storage media of claim 15, wherein the pre-determined threshold of input activity comprises a count of inputs received.

17. The one or more non-transitory computer-readable storage media of claim 15, the monitoring for attention command input inside and outside the active zone comprising a reduced scan rate, reduced set of sensors, or both compared to monitoring the active zone for input.

18. The one or more non-transitory computer-readable storage media of claim 15, further comprising:
   receiving the attention command input;
   designating a volume as an active zone within an inactive zone; and
   monitoring the active zone for input.

19. The one or more non-transitory computer-readable storage media of claim 18, wherein the volume of the active zone is proximate to or encompasses the attention command input.

20. One or more non-transitory computer-readable media storing computer-executable instructions that, when executed, cause one or more processors to perform acts comprising:
   identifying an object within an augmented reality scene;
   when the object is identified as a designated input object:
      designating a zone of the augmented reality scene proximate to or encompassing the object as an active zone of the augmented reality scene;

monitoring the active zone of the augmented reality scene for input;

accepting the input from within the active zone of the augmented reality scene;

when the object is identified as a non-designated input object:

designating a zone of the augmented reality scene proximate to or encompassing the object as an inactive zone of the augmented reality scene;

storing an indication that the zone of the augmented reality scene proximate to or encompassing the object is designated as an inactive zone of the augmented reality scene;

monitoring the inactive zone of the augmented reality scene for an attention command input; and accepting the attention command input from within the inactive zone of the augmented reality scene and disregarding or not detecting other input from within the inactive zone of the augmented reality scene.

21. The one or more non-transitory computer-readable storage media of claim 20, wherein the designated input object comprises at least a portion of a user.

22. The one or more non-transitory computer-readable storage media of claim 20, wherein the designated input object comprises a portable projection screen.

23. The one or more non-transitory computer-readable storage media of claim 20, wherein a size of the zone associated with the object is proportionate to the function of the object.

24. The one or more non-transitory computer-readable storage media of claim 20, wherein the attention command input comprises a signal initiated by a user.

25. A method comprising:

receiving an attention command input within an augmented reality environment, the attention command input comprising a signal generated at least in part by a user;

designating, by one or more hardware processors, a first zone of the environment as an active zone within the environment;

receiving other input commands from within the active zone of the environment;

designating a second zone of the environment as an inactive zone of the environment;

storing an indication that the second zone of the environment is designated as an inactive zone of the environment;

monitoring the inactive zone of the environment for the attention command input; and accepting the attention command input from within the inactive zone of the environment and disregarding or not detecting other input from within the inactive zone of the environment.

26. The method of claim 25, wherein the signal comprises speech of the user.

27. The method of claim 25, wherein the active zone is configured to track an object associated with the signal.

28. The method of claim 25, wherein the signal comprises an audible signal and wherein the receiving further comprises locating within the environment the source of the attention command with acoustic location via a plurality of microphones within the environment.

29. The method of claim 25, wherein the volume of the active zone is proximate to or encompasses the attention command input.

* * * * *